United States Patent Office 3,125,602
Patented Mar. 17, 1964

3,125,602
N-ALKYL-N-NITROSO ALKYL SULFONAMIDES
Henry A. Hill, Watertown, Mass., and William P. ter Horst, Pikesville, Md., assignors to National Polychemicals, Inc., Wilmington, Mass., a corporation of Massachusetts
No Drawing. Filed Nov. 29, 1957, Ser. No. 699,445
3 Claims. (Cl. 260—556)

The present invention relates to methods and agents for blowing polymeric materials such as rubbers, plastics resins, etc.

The principal object of this invention is to provide blowing agents and blowing methods which will have the desirable characteristics of low cost, non-toxicity, ready dispersion in the stock, release of nitrogen at a proper rate of curing or at processing temperatures and capable of producing a cellular product, open or closed cell, which will be light in color and free from odor.

Although it is recognized that nitrosoamines, as a class, generally are not satisfactory blowing agents, we have discovered that certain nitrososulfonamides, more particularly N-alkyl-N-nitrososulfonamides, possess characteristics which permit their use, alone or with selected adjuvants, in achieving the aforementioned objectives. These N-alkyl-N-nitrososulfonamides fall within a group embraced by the general formula:

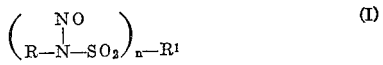

wherein $n$ is 1 to 4; R is a primary normal alkyl having from 1 to 6 carbon atoms; and $R^1$ is an aryl, including a substituted aryl and alkyl, including a substituted alkyl, an aralkyl, an alicyclic or heterocyclic group, it being understood that the substituents may be an alkoxy, aryloxy, thioalkyl or thioxoalkyl group.

These N-alkyl-N-nitrososulfonamides are prepared by reacting a compound containing a sulfonylchloride function with a primary normal alkylamine and nitrosating the resulting N-alkylsulfonamide with nitrous acid in the manner hereinafter set forth.

In accordance with the present invention from 1 to 25 parts by weight of a selected blowing agent as defined above (I) are uniformly dispersed in 100 parts by weight of a plastomer, herein defined as a polymeric material including not only natural and synthetic rubbers, polyvinyl chloride, polyvinyl alcohol, polyethylene, polystyrene, polyesters, epoxy resins and other plastic mixtures, but also a monomer or monomer mixture from which such polymeric materials are produced. The amount of blowing agent and the selected plastomer will depend on the particular product desired, and likewise the use of vulcanizers, curing agents, adjuvants, etc. will be governed by the selected plastomer. Where the blowing agent is incorporated in a monomer or monomer mixture, the latter may be polymerized and the polymer "blown in situ" preferably at a temperature somewhat higher than the polymerization temperature.

Illustrative examples of compounds conforming to the Formula (I) that have been tested as blowing agents in rubber and plastics are hereinafter set forth.

The amines producing the preferred compounds are limited to the primary normal alkylamines which have a relatively low molecular weight. A large number of mono and poly-functional sulfonylhalides are suitable in preparing the N-alkyl-N-nitrososulfonamides, and in general, alphatic-, aromatic- and alicyclicsulfonyl chlorides are useful. The sulfonylchlorides from which the N-alkyl-N-nitrososulfonamides are derived one may employ: methanesulfonyl chloride, octanesulfonyl chloride, 1-naphthalenesulfonyl chloride, naphthalene-disulfonyl chloride(s), xylene-disulfonyl chloride, naphthalene trisulfonyl chloride, 4-acetylamino benzenesulfonyl chloride, nitro-methanesulfonyl chloride, butanedisulfonyl chloride(s), trimethyl-silylmethanesulfonyl chloride, cyclohexanesulfonyl chloride, cyclohexanedisulfonyl chloride, cyclopentanesulfonyl chloride, sulfamylsulfonyl chloride, benzene-ethanesulfonyl chloride, ethylenesulfonyl chloride, piperidinesulfonyl chloride, dimethylaminesulfonyl chloride, 2-thiopenesulfonyl chloride, para-methoxybenzenesulfonyl chloride, para-hydroxybenzenesulfonyl chloride, oxy-bis(cyclohexylsulfonyl chloride), 3-pyridinesulfonyl chloride, sulfonyl-bis-benzenesulfonyl chloride.

Specific procedures for preparing the blowing agents are as follows, all parts being by weight:

Example 1

The compound N-methyl-N-nitroso - 1 - butanesulfonamide is prepared by nitrosation of N-methyl-1-butanesulfonamide which is obtained by reacting 1-butanesulfonyl chloride with monomethylamine, according to the following reactions:

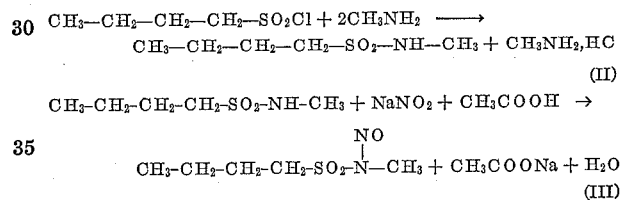

In carrying out the foregoing 105 parts of 1-butanesulfonyl chloride were added in the course of one hour to a solution of 112 parts of 40% monomethylamine in 250 parts of ice water. The methylamine solution was stirred vigorously, cooled externally with ice water and the butanesulfonyl chloride was added to the vortex. The temperature at the start was 10° C. and was 15° C. when all the butanesulfonyl chloride had been added, at which time the reaction was still alkaline to litmus. On standing, the N-methyl-1-butanesulfonamide separates as the bottom layer, a light brown oil giving a yield of 61 parts.

The nitrosation was carried out in glacial acetic acid as follows: 45.3 parts of N-methyl-1-butanesulfonamide were dissolved in 200 parts of glacial acetic acid and to this solution was added gradually, with agitation and external ice water cooling, a solution of 21 parts (.3 mole) of sodium nitrite in 70 parts water. The temperature was maintained at 10–11° C. and the time required to add the sodium nitrite solution was 35 minutes. To the resulting light yellow emulsion was added 500 parts of water and agitation was continued for one more hour. The reaction mixture was acid to Congo red, showing an excess of acid and turned potassium iodide starch paper blue, showing an excess of nitrous acid. The N-methyl-N-nitroso-1-butanesulfonamide was separated out as the bottom layer, was washed twice with 100 parts of water to remove excess acids. The yield was 35 parts of a light brown oil.

When heated rapidly in a test tube the oil boils with moderate evolution of gas and then on further heating puffs vigorously, giving off white fumes consisting mainly of nitrogen.

*Example 2*

The compound meta-di(N-methyl-N-nitroso)benzenedisulfonamide is synthesized from meta-benzenedisulfonyl chloride, methylamine and nitrous acid, according to the following reactions:

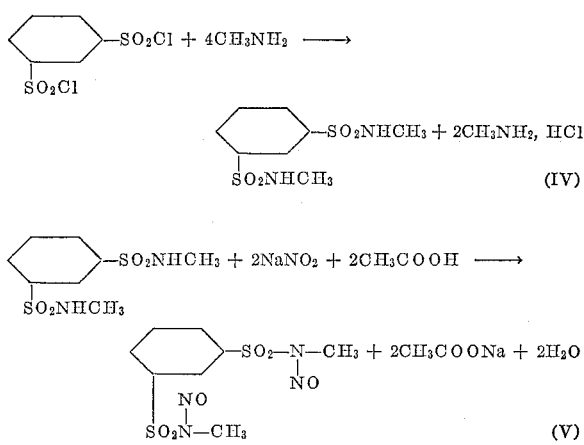

Meta-benzenedisulfonyl chloride (82.5 parts or 0.3 mole) was added gradually, with vigorous agitation to 112 parts of 40% monomethylamine diluted with 100 parts of water and 150 parts crushed ice. The temperature at the start was 0° C. The meta-benzenedisulfonyl chloride was added in the course of twenty-minutes with a temperature rise to 23° C., and the dispersion of meta-benzene di(N-methylsulfonamide) was warmed, while agitating, to 60° C. The total reaction time was three and one half hours. The dispersion was cooled to 20° C., the methylsulfonamide filtered, washed with water, giving a yield of 99 parts of moist methylsulfonamide.

The dinitrosation was carried out as follows: 94 parts (approximately .3 mole) of the moist meta-benzene di-(N-methylsulfonamide) were added to 300 parts of glacial acetic acid and to this dispersion was added with vigorous agitation in the course of seventy minutes a solution of 42 parts (.6 mole) of sodium nitrite in 120 parts of water. The temperature was 10° C. at the start and 8° C. at the end of the nitrite addition. A yellow dispersion formed, and agitation was continued for one hour. Thereafter 1000 parts of water were added and the mass agitated at room temperature for another hour. The yellow nitroso compound formed settled to the bottom and the reaction was acid to Congo red and potassium iodide-starch turns blue. The meta di(N-methyl-N-nitroso)-benzenedisulfonamide, a bright yellow powder, was filtered, washed with water and dried, giving a yield of 72 parts which had a melting point of 116–118° C. with decomposition. The pure chemical, crystallized from acetone melts at 127–128° C. with decomposition. When heated rapidly in a test tube, above its melting point, this new chemical puffs vigorously.

*Example 3*

N-methyl-N-nitrosobenzenemethanesulfonamide is prepared in a manner similar to that described in Examples 1 and 2 from benzenemethanesulfonyl chloride, monomethylamine and sodium nitrite, according to the following reaction:

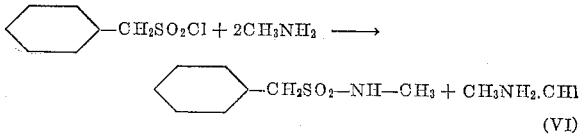

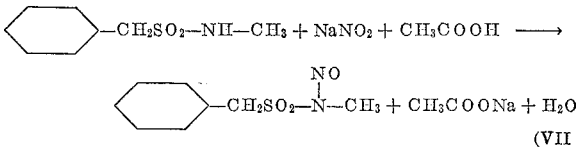

In carrying out these reactions 100 parts of benzenemethanesulfonyl chloride were added in the course of ten minutes to an agitated solution of 95 parts of 40% monomethylamine in 1000 parts water at 8–10° C. The compound that is formed is dispersed in the water. The temperature was raised, gradually, in the course of one hour, while agitating, to 60° C. in order to complete the reaction. The mass was cooled to room temperature and the N-methyl-benzenemethanesulfonamide was filtered, washed and dried, giving a yield of 105 parts of white shiny leaflets. N - methyl - benzenemethanesulfonamide (45 parts) was dissolved in 500 parts glacial acetic acid and to this solution was added, with vigorous agitation at 5–8° C. and in the course of 15 minutes, a solution of 20 parts of sodium nitrite in 100 parts water. A clear solution results, which turns cloudy and then gradually a solid reaction product separates. Water (1000 parts) was added and agitation continued three hours at approximately 12° C. The reaction was acid to Congo red and potassium iodide-starch turned blue. The N-methyl-N-nitrosobenzenemethanesulfonamide, a white powder, was filtered, washed with water and dried giving a yield of 45 parts with a melting point of 78–79° C. (no decomposition). When heated rapidly above its melting point the material puffed vigorously and the residue was a yellow liquid, apparently methyl benzenemethanesulfonate according to the following reaction:

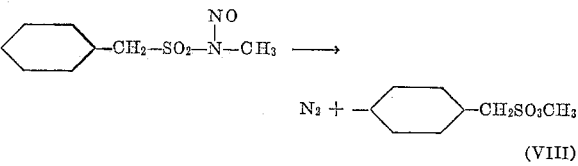

*Example 4*

The compound N-methyl - N - nitroso-p-toluenesulfonamide was prepared as follows: 190.5 grams paratoluenesulfonyl chloride were divided in three portions of 114 grams, 57 grams and 19.5 grams, respectively; and 40 grams caustic soda were dissolved in about 220 ml. water, the resulting solution being divided in three portions, 60%, 30% and 10%, respectively.

A solution was prepared comprising 93 grams of 40% aqueous monomethylamine, 400 ml. ice water and 400 grams crushed ice.

The first, 60% portion of paratoluenesulfonyl chloride was added gradually, with vigorous agitation to the methylamine solution. Then, the first portion (60%) of caustic soda solution was added, after which the second portion (30%) of paratoluenesulfonyl chloride was added gradually, followed by the second portion (30%) of the caustic soda solution. Finally the last portion (10%) of paratoluenesulfonyl chloride and of caustic soda solution were added. Throughout the temperature was maintained at 5–15° C. In order to complete the reaction the temperature was raised to 50° C. and the mass was then cooled to 20° C. by addition of crushed ice while agitating. A white dispersion results, alkaline to litmus. It is not necessary to isolate the sulfonamide. A sample was taken, filtered and dried and the melting point determined. The pure N-methyl-p-toluenesulfonamide melted at 78–79° C. The mass was allowed to settle and the supernatant liquor was syphoned off.

The nitrosation was carried out as follows:

To the decanted N-methyl-p-toluenesulfonamide dispersion there was added 1000 ml. water, 500 grams crushed ice, 200 ml. conc. hydrochloric acid and 5 ml. Du Pont wetting agent, Product BCO. A solution of 70 grams sodium nitrite in 200 ml. water was added from a separatory funnel, gradually to the sulfonamide dispersion with fast agitation (vortex) in the course of one-half hour, keeping the temperature at 18–22° C. by addition of ice as required. A light yellow dispersion resulted which was acid to Congo red and turned starch-iodide blue. When the agitator was stopped the nitroso-compound floats on top. The reaction mixed was stirred for at least six hours or permitted to stand overnight and when the reaction was completed the reaction product settled to the bottom. The supernatant liquor was decanted, stirred with water, permitted to settle, decanted again, etc. until no longer acid. The reaction product was filtered, dried at room temperature, and found to have a yield of 189 grams, light yellow powder having a melting point of 57–58° C. When crystallized from isopropylalcohol the melting point was 63–65.5° C.

*Example 5* p, p'-Oxy-bis (N-methyl-N-nitrosobenzenesulfonamide) is synthesized as follows:

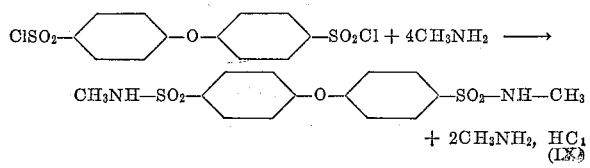

183.5 parts (.5 mole) of oxy-bis-benzenesulfonyl chloride, prepared from diphenyl ether and chlorosulfonic acid, were added gradually in the course of one half hour with agitation to 227.5 parts of 40% monomethylamine, diluted with 900 parts of water and 100 parts of crushed ice. The temperature was maintained at 5–6° C. The oxy-bis (N - methyl - benzenesulfonamide) formed is a white powder and the reaction mixture was alkaline to litmus. In order to complete the reaction the white dispersion was heated to 80° C. with agitation. The total reaction time was two hours. The dispersion was then cooled to 20° C., the resulting oxy-bis (N-methyl-benzenesulfonamide) was filtered, washed with water and partially dried. The yield of moist sulfonamide was 196 parts (theoretical yield 178 parts) with a melting point 152–153° C.

Dinitrosation was carried out according to the following reaction:

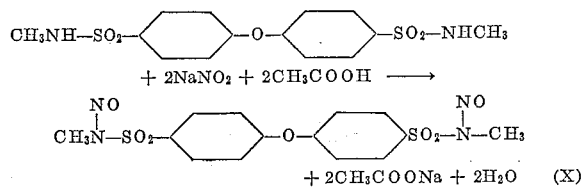

The 196 parts (.5 mole) of moist oxy-bis (N-methyl-benzenesulfonamide) was dispersed in 1000 parts glacial acetic acid (partially dissolved) and, with vigorous agitation and external cooling with ice water there was gradually added to the vortex a solution of 70 parts (1 mole) of sodium nitrite in 200 parts of water. The color of the dispersion changed to light yellow. The temperature was maintained at 9–13° C. and the time required to add the nitrite solution was 100 minutes. The reaction was acid to Congo red and potassium iodide-starch paper turned blue. While agitating, the dispersion was warmed to 30° C. in the course of one half hour, after which 750 parts of water were added and agitation continued at room temperature for 10 minutes. The yellow colored powder of p,p'-oxy-bis (N-methyl-N-nitrosobenzenesulfonamide) was filtered, washed with water and dried to yield 196 parts (94.6% of theoretical) having a melting point of 131–133° C. with decomposition and when crystallized from methylethyl-ketone, the melting point was 145–146° C. with decomposition. The material was analyzed for carbon, nitrogen, hydrogen and sulfur content and proved to be the desired compound p,p'-oxy-bis (N-methyl-N-nitrosobenzenesulfonamide) having the formula $C_{14}H_{14}N_4O_7S_2$ and a molecular weight of 414. The analysis showed:

|  | Percent Carbon | Percent Hydrogen | Percent Nitrogen | Percent Sulfur |
| --- | --- | --- | --- | --- |
| Theoretical | 40.58 | 3.38 | 13.53 | 15.46 |
| Found | 41.00 | 3.3 | 13.6 | 15.3 |

When heated rapidly above its melting point the new nitroso compound puffs vigorously.

The following examples illustrate the performance of the blowing agents of this invention in vulcanized rubber and plastic articles.

*Example 6*

A masterbatch was made from the following:

| Ingredient: | Parts by weight |
| --- | --- |
| Styrene-butadiene rubber 1010 [1] | 85.0 |
| Styrene-butadiene rubber 1006 [2] | 15.0 |
| Styrene-butadiene resin [3] | 15.0 |
| Coumarone-indene resin (soft. pt. 220° F.) | 10.0 |
| Octylated diphenylamine | 1.0 |
| Stearic acid | 4.0 |
| Soft clay | 70.0 |
| Hydrated silica | 30.0 |
| Ground whiting | 25.0 |
| Zinc oxide | 5.0 |
| Titanium dioxide | 15.0 |
| Process oil | 15.0 |
| Total | 290.0 |

[1] Styrene 23.5 parts, butadiene 76.5 parts polymerized at 122° F.; Mooney viscosity (ML4 at 212° F.) 30.
[2] Styrene 23.5 parts, butadiene 76.5 parts polymerized at 122° F.; contains a non-staining antioxidant Mooney viscosity (ML4 at 212° F.) 50.
[3] A copolymer resin styrene 85 parts, butadiene 15 parts.

To portions of the masterbatch were added the following:

FINAL BATCH

| | |
| --- | --- |
| Masterbatch | 290.0 |
| Blowing agent | 10.0 |
| Dibenzothiazyldisulfide | 0.8 |
| Urea | 4.8 |
| Diethyleneglycol | 1.0 |
| Sulfur | 3.5 |

The compounds were cured in the press 13 minutes at 315° F. then heated 15 minutes at 315° F. in an oven at atmospheric pressure. The compound cured in the absence of the blowing agent had a specific gravity 70° F./70° F. of 1.42, but with the indicated blowing agents the specific gravities were as follows:

|  | Specific Gravity, 70° F./70° F. | Percent Expansion [a] | Percent Expansion Per Part Blowing Agent |
| --- | --- | --- | --- |
| N-methyl-N-nitroso-1-butanesulfonamide | 0.23 | 515 | 51.5 |
| N-methyl-N-nitrosobenzenemethanesulfonamide | 0.26 | 446 | 44.6 |
| N-methyl-N-nitroso-p-toluenesulfonamide | 0.36 | 296 | 29.6 |
| p,p'-Oxy-bis-(N-methyl-N-nitrosobenzenesulfonamide) | 0.36 | 296 | 29.6 |

[a] Percent expansion = $\frac{\text{Final volume} - \text{initial volume}}{\text{initial volume}} \times 100$.

*Example 7*

To portions of the masterbatch described under Example 6 were added the following:

| | |
| --- | --- |
| Masterbatch | 290.0 |
| Blowing agent | 10.0 |
| Dibenzothiozyldisulfide | 1.8 |
| Diortholoylguanidine | 0.3 |
| Diethyleneglycol | 1.0 |
| Sulfur | 3.5 |

The compounds were cured 13 minutes at 315° F. and then heated for 15 minutes at 315° F. The following table shows the specific gravities for the indicated blowing agents:

|  | Specific Gravity, 70° F./70° F. | Percent Expansion | Percent Expansion Per Part Blowing Agent |
|---|---|---|---|
| N-methyl-N-nitroso-p-toluenesulfonamide | 0.39 | 264 | 26.4 |
| Oxy-bis-(N-methyl-N-nitrosobenzenesulfonamide) | 0.36 | 296 | 29.6 |

*Example 8*

Two of our new blowing agents were evaluated in a closed cell polyvinylchloride sponge, made of the following plastisol:

Polyvinylchloride, Geon 121 _____ 100.0
Dioctylphthalate _____ 50.0
Diiso decylphthalate _____ 50.0
Epoxidized soya bean oil _____ 5.0
Metasap 262-A (Ba-Zn fatty acid salt) _____ 3.0
Blowing agent _____ 15.0
Molded 20 min. at 335° F.
Expanded ½ hour at 212° F.

Specific gravity 70° F./70° F. unblown stock was 1.20 and the specific gravities of the blown stock with the designated blowing agents were as follows:

|  | Specific Gravity, 70° F./70° F. | Percent Expansion | Percent Expansion Per Part Blowing Agent |
|---|---|---|---|
| N-methyl-N-nitrosoparatoluenesulfonamide | 0.25 | 380 | 25.4 |
| N-methyl-N-nitrosobenzenemethanesulfonamide | 0.26 | 360 | 24.0 |

*Example 9*

Three of our new blowing agents were evaluated in an open cell polyvinylchloride sponge made of the same plastisol as described above in Example 8.

Foamed 15 min. at 212° F.
Fused 15 min. at 325° F.

N-methyl-N-nitroso-p-toluenesulfoamide, N-methyl-N-nitrosobenzenemethanesulfonamide, and N-methyl-N-nitroso-1-butanesulfonamide yielded good, lightweight open cell sponges.

*Example 10*

A number of N-alkyl-N-nitrososulfonamides were evaluated as blowing agents in the following rubber formulation:

Styrene-butadiene rubber 1001 [1] _____ 100.0
Styrene-butadiene resin [2] _____ 13.0
Coumarone-indene resin (soft. pt. 220° F.) ____ 7.0
Hydrated silica _____ 40.0
Hard clay _____ 35.0
Zinc oxide _____ 4.0
Process oil _____ 11.0
Phthalic anhydride _____ 1.0

[1] Styrene 23.5-butadiene 76.5 parts polymerized at 122° F., Mooney viscosity (ML4 at 212° F.) 48.
[2] Styrene 85 parts, butadiene 15 parts, copolymer.

Octylated diphenylamine _____ 1.0
Polyethyleneglycol (mol. wt. 4000) _____ 1.3
Stearic acid _____ 2.7
Dibenzothiozyldisulfide _____ 0.7
Blowing agent _____ 7.0
Cure 9 minutes at 335° F.

The unblown stock had a specific gravity 70° F./70° F. of 1.22, and the specific gravities of the blown stock with the designated blowing agents are shown in the following table:

Blowing agent:         Specific gravity, 70° F./70° F.
  N-methyl-N-nitroso-p-toluenesulfonamide ____ 0.49
  p,p'-Oxy-bis-(N-methyl - N - nitrosobenzenesulfonamide) _____ 0.45
  N-methyl-N-nitroso-1-butanesulfonamide ____ 0.33
  Meta-di-(N-methyl-N - nitroso) benzenedisulfonamide _____ 0.35
  N-amyl-N-nitroso-p-toluenesulfonamide _____ 0.73
  N-butyl-N-nitroso-p-toluenesulfonamide _____ 0.50
  N-hexyl-N-nitroso-p-toluenesulfonamide _____ 0.87
  N-nitroso-N-propyl-p-toluenesulfonamide ____ 0.48
  N-methyl-N-nitrosoethanesulfonamide _____ 0.47
  N-methyl-N-nitroso-o-toluenesulfonamide ___ 0.56
  N-methyl-N-nitroso - 3,5 - dimethylbenzenesulfonamide _____ 0.50
  N-methyl-N-nitroso-2,4 - dimethylbenzenesulfonamide _____ 0.52
  N-methyl-N-nitroso - p - chlorobenzenesulfonamide _____ 0.63
  N-methyl-N-nitrosobenzenesulfonamide _____ 0.63
  N-methyl-N-nitroso-2-naphthalenesulfonamide_ 0.66
  N-methyl-N-nitroso - 3,4 - dichlorobenzenesulfonamide _____ 0.85
  N-methyl-N-nitroso - 2,5 - dichlorobenzenesulfonamide _____ 0.93
  Meta - N - nitrosomethylamidosulfonyl - N-methyl-N-nitrosobenzamide _____ 0.60

The following compounds when run in the same masterbatch with 2.2 parts of urea and cured as above, gave the following specific gravities:

Compound:         Specific gravity, 70° F./70° F.
  N-allyl-N-nitroso-p-toluenesulfonamide _____ 0.80
  N-methyl-N-nitroso-p-nitrobenzenesulfonamide 0.76
  N-methyl-N-nitroso-m-nitrobenzenesulfonamide 0.84

We claim:
1. A liquid N-alkyl-N-nitroso alkyl sulfonamide having the general formula:

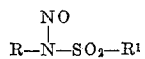

wherein R is a primary normal alkyl having 1 to 6 carbon atoms and R[1] is an alkyl radical.
2. N-methyl-N-nitroso-1-butane sulfonamide.
3. N-methyl-N-nitrosoethanesulfonamide.

References Cited in the file of this patent

UNITED STATES PATENTS

| 2,683,696 | Muller et al. | July 13, 1954 |
| 2,754,326 | Bradley et al. | July 10, 1956 |
| 2,828,300 | Von Glahn | Mar. 25, 1958 |
| 3,052,642 | Hunter | Sept. 4, 1962 |

OTHER REFERENCES

Hey et al.: "Recueil des Travaux Chimiques des Pays—Bas," Tome 73, No. 9/10, September–October 1954, pages 686 to 694.